(12) United States Patent
Kodama et al.

(10) Patent No.: US 6,694,406 B2
(45) Date of Patent: *Feb. 17, 2004

(54) MULTIPLE PROCESSOR DATA PROCESSING SYSTEM WITH MIRRORED DATA FOR DISTRIBUTED ACCESS

(75) Inventors: Shoji Kodama, San Jose, CA (US); Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/374,655

(22) Filed: Feb. 24, 2003

(65) Prior Publication Data

US 2003/0131193 A1 Jul. 10, 2003

Related U.S. Application Data

(63) Continuation of application No. 09/815,494, filed on Mar. 21, 2001, now Pat. No. 6,542,962.

(51) Int. Cl.[7] .............................................. G06F 12/00
(52) U.S. Cl. ...................... 711/114; 711/148; 711/162; 709/214; 714/6
(58) Field of Search ................................ 711/114, 148, 711/162; 709/214; 714/6

(56) References Cited

U.S. PATENT DOCUMENTS

| | | | | |
|---|---|---|---|---|
| 4,802,164 A | * | 1/1989 | Fukuoka et al. | 714/44 |
| 4,837,680 A | * | 6/1989 | Crockett et al. | 710/104 |
| 5,155,845 A | * | 10/1992 | Beal et al. | 714/6 |
| 5,680,574 A | * | 10/1997 | Yamamoto et al. | 712/207 |
| 5,781,908 A | * | 7/1998 | Williams et al. | 709/223 |
| 5,890,156 A | * | 3/1999 | Rekieta et al. | 707/10 |
| 5,917,998 A | * | 6/1999 | Cabrera et al. | 714/6 |
| 6,003,045 A | * | 12/1999 | Freitas et al. | 707/205 |
| 6,092,213 A | * | 7/2000 | Lennie et al. | 714/3 |
| 6,397,292 B1 | * | 5/2002 | Venkatesh et al. | 711/114 |
| 6,408,369 B1 | * | 6/2002 | Garrett et al. | 711/165 |
| 6,542,962 B2 | * | 4/2003 | Kodama et al. | 711/114 |

* cited by examiner

Primary Examiner—Hiep T. Nguyen
(74) Attorney, Agent, or Firm—Townsend and Townsend and Crew LLP (57) ABSTRACT

A data storage includes multiple disk units accessible to multiple processors/servers. The multiple disk units include a master disk unit and a one or more data-mirroring disk units. A data-mirroring disk unit is assigned to a corresponding ones of the multiple servers by one of the processors designated as the mount manager. Data is written by the processors to the data storage is written to the master disk unit, and copied by the data storage to the data-mirroring disk units. Data is read by each of the processors from the data-mirroring disk unit assigned to such processor.

4 Claims, 10 Drawing Sheets

FIG_1

MIRRORING GROUP TABLE $30$

| GROUP ID | MASTER DISK | MIRRORED DISK 1 | MIRRORED DISK 2 | MIRRORED DISK 3 |
|---|---|---|---|---|
| G01 | DISK $20_1$ | DISK $20_2$ | DISK $20_3$ | NONE |
| G02 | DISK 23 | DISK 24 | DISK 25 | DISK 26 |

$30_a$, $30_b$, $30_c$, $30_d$, $30_e$

FIG_2

MOUNT POINTS TABLE $32$

| SERVER | MOUNT POINT |
|---|---|
| SERVER $12_2$ | DISK $20_3$ |
| SERVER $12_3$ | DISK $20_2$ |

$32_a$, $32_b$

FIG_3

DISK UNIT STATUS TABLE $34$

| DISK NAME | AVAILABLE? |
|---|---|
| DISK $20_1$ | YES |
| DISK $20_2$ | YES |
| DISK $20_3$ | NO |

$34_a$, $34_b$

FIG_4

MOUNT POINT ID TABLE

FIG_5

DATA STATUS BITMAP TABLE

| | | | | | | | | | | | |
|---|---|---|---|---|---|---|---|---|---|---|---|
| G01 | Disk01 | Disk Block # | 1 | 2 | 3 | 4 | 5 | 6 | 7 | 8 | 9 |
| | | Updated | Y | N | N | Y | N | N | N | N | N |
| | Disk02 | Disk Block # | 1 | 2 | 3 | 4 | 5 | 6 | 7 | 8 | 9 |
| | | Stale | N | N | Y | Y | N | N | N | N | N |
| | Disk03 | Disk Block # | 1 | 2 | 3 | 4 | 5 | 6 | 7 | 8 | 9 |
| | | Stale | N | N | N | Y | N | N | N | Y | Y |
| G02 | Disk23 | Disk Block # | 1 | 2 | 3 | 4 | 5 | 6 | 7 | 8 | 9 |
| | | Updated | Y | N | N | Y | N | N | N | N | N |
| | Disk24 | Disk Block # | 1 | 2 | 3 | 4 | 5 | 6 | 7 | 8 | 9 |
| | | Stale | N | N | Y | Y | N | N | N | N | N |
| | Disk25 | Disk Block # | 1 | 2 | 3 | 4 | 5 | 6 | 7 | 8 | 9 |
| | | Stale | Y | N | N | Y | N | N | N | Y | Y |
| | Disk26 | Disk Block # | 1 | 2 | 3 | 4 | 5 | 6 | 7 | 8 | 9 |
| | | Stale | Y | N | N | Y | N | N | N | Y | Y |

FIG_6

MIRROR GROUP STATUS TABLE

| GROUP ID | STATUS |
|---|---|
| G01 | MIRRORED |
| G02 | SPLIT |

FIG_7

FIG_8

FIG_9

FIG_11

FIG_10

FIG_12

FIG_13

FIG_14

MIRROR GROUP STATUS TABLE

200

| Group ID | Status |
|---|---|
| G01 | SPLIT |

FIG_15

210a

DATA STATUS BITMAP TABLE

210b

| G01 | Disk 20₁ | Disk Block # | 1 | 2 |
|---|---|---|---|---|
|  |  | Updated | N | N |
|  | Disk 20₂ | Disk Block # | 1 | 2 |
|  |  | Stale | N | N |

FIG_16A

| G01 | Disk 20₁ | Disk Block # | 1 | 2 |
|---|---|---|---|---|
|  |  | Updated | Y | N |
|  | Disk 20₂ | Disk Block # | 1 | 2 |
|  |  | Stale | N | N |

FIG_16B

| G01 | Disk 20₁ | Disk Block # | 1 | 2 |
|---|---|---|---|---|
|  |  | Updated | N | N |
|  | Disk 20₂ | Disk Block # | 1 | 2 |
|  |  | Stale | Y | N |

210c

FIG_16C

MULTIPLE PROCESSOR DATA PROCESSING SYSTEM WITH MIRRORED DATA FOR DISTRIBUTED ACCESS

BACKGROUND OF THE INVENTION

The present invention relates generally to data processing systems, and more particularly to a method that distributes multiple copies of data across multiple disk drives of a storage system for improved and parallel access to that data by multiple processors.

There are many factors that can operate against optimum performance of a data processing system. One such factor stems from the relative disparity between the time is takes to perform a data access (e.g., read or write) of a peripheral storage of a data processing system and the operating speed of a data processor making that access. This disparity is made more evident with today's penchant for clustered systems in which most, if not all, of the multiple processors of the system compete for access to the available data storage systems. Unfortunately, the storage systems in these and other multiple processor environments tend to form a bottleneck when being accessed by several of the processors of the system at the same time. The problem is worse with poor storage system design that makes it difficult for the storage system to handle multiple, simultaneous input/output (I/O) requests, severely impacting system performance. In addition, poor storage system design can create an environment that gives rise to possible irreparable loss of data.

Among prior solutions are those used using data redundancy to both backup the data, protecting against loss, and to allow parallel access for improving system performance. Such solutions include redundant arrays of independent (or inexpensive) disks (RAID). There are various RAID configurations or levels, some using data striping (spreading out blocks of each file across multiple disks) and error correction techniques for data protection, but redundancy is not used. Thus, although these RAID configurations will tend to improve performance, they do not deliver fault tolerance. However, data redundancy is used by a RAID level (RAID1) that employs disk mirroring, thereby providing redundancy of data and fault tolerance RAID1 is a well known technology to increase the I/O performance. Typically the disk mirroring employed by RAID1 incorporates a group of several disk drives, but provides a single disk drive image to servers.

Storage systems employing a RAID1 architecture will usually limit read/write outside accesses to a master disk drive. When an I/O write request is received by a RAID1 storage system, the data of the request is written to the master disk. A disk controller of the storage system will then handle replication of that data by writing it to all of the mirrored disks. The end result is that each and every disk of the storage system will have the same data.

When An I/O read request is received, a disk selector module, typically found in the disk controller, will select one of the mirrored disks to read in order to balance the loads across the disk drives of the system. A disk controller is capable of reading data from multiple disk units in parallel. This is why the disk mirroring increases the performance of data read operations.

But this technology has at least two problems. First, processor elements of the system can be subjected to high loads which restricts the number of I/O requests which the disk controller can process in a period of time. Second, when an I/O write request is received by the storage device, the requesting system element (e.g., a processor) must wait for a response until the disk controller writes the data to all the disk drives. This can introduce latency in data write operations.

SUMMARY OF THE INVENTION

Broadly, the present invention relates to a method of allocating each of a number of processor units to a corresponding one of a number of disk storage units. In this way, each processor unit can read data from its allocated disk storage unit with minimum conflict to other read and/or write operations conducted at or about the same time by other processor units. Multiple, simultaneous accesses for data will not create or encounter a bottleneck. In addition, the redundancy produced by this approach provides a storage system with fault tolerance.

The invention, then, is directed to a processing system that includes a number of processor elements connected to disk storage having a plurality of disk storage units for maintaining data. One of the processor elements, designated a "Mount Manager," is responsible for assigning a disk storage unit to a corresponding one of the other processor elements so that, preferably, there is a one-to-one correspondence between a disk storage unit and a processor element. One of the disk storage units is designated a master disk unit, and the remaining disk storage units are designated "mirrored" disk units. A disk controller of the storage system controls the writing to and reading from the disk storage units. The disk controller receives I/O write requests from the processor elements to write the data of that request only to the master disk unit. A sync daemon running on the disk controller copies the written data to the mirrored disk units. Each of the processor elements issue I/O read request to, and read data from, the mirrored disk unit assigned to it by the Mount Manager. If, however, the I/O read request is issued before the allocated mirrored disk unit has been updated with data recently written to the master disk unit, the requested data will be read from the master disk unit. To detect such a situation, the disk controller and the sync daemon use a bitmap status table that indicates which disk block in each mirrored disk drive has a stale data or updated data.

In an alternate embodiment of the invention the mirrored disks are not updated immediately. Rather, data written to the mirrored disks are fixed as of that point in time they are updated. Changes to that data on the master disk unit are not immediately written to update the mirrored disks until a processor element issues a "SNAPSHOT" request to the storage system. At that time the sync daemon of the disk controller will determine which data needs to be written to the mirrored disk units for updating, and identify them. Then, the sync daemon will update those mirrored disk storage units needing updating. In addition, when data is proposed to be written to the master disk unit, the disk controller first checks to see of the data that will be overwritten has been copied to the mirrored disk units. If not, the data that will be over-written is first copied to the mirrored disk units before being changed.

A number of advantages are achieved by the present invention. First is that by providing redundant data by mirroring the content of the master disk unit and assigning specific ones of the mirrored disk units to corresponding ones of the processor elements, parallel read accesses may be made, thereby improving system operation.

These and other advantages of the present invention will become apparent to those skilled in this art upon a reading of the following description of the specific embodiments of the invention, which should be taken in conjunction with the accompanying drawings.

DESCRIPTION OF THE SPECIFIC EMBODIMENTS

Figure 1:
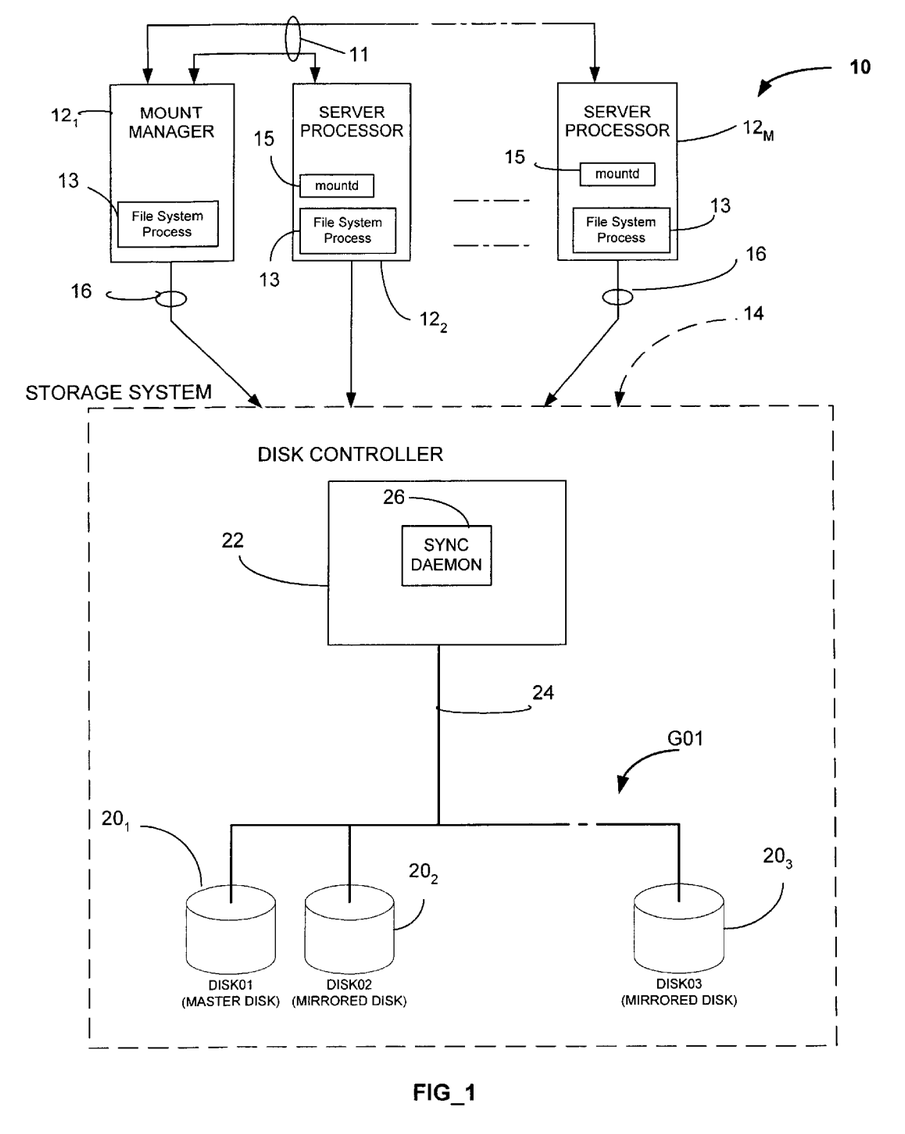
FIG. 1 is a block diagram broadly illustrating a data processing system incorporating the present invention.

Turning now to the Figures, and for the moment specifically FIG. 1, there is illustrated a data processing system, generally identified with the reference numeral 10, that comprises a number of server processors 12, including one (server processor $12_1$) that serves as a "Mount Manager." The server processors $12_2, \ldots, 12_3$ are communicatively interconnected to the Mount Manager $12_1$ by a network structure 11 which may be, for example, a local area network architecture such as Ethernet using a TCP/IP protocol, or a fiber channel architecture.

In addition, the Mount Manager $12_1$ and server processors $12_2, \ldots, 12_3$ are connected to a storage system 14 by an communicative interconnections 16, which may be part of the same network architecture as the network structure 11, a separate network, or individual connections such as a fiber channel architecture using a small computer system interface (SCSI) protocol. The storage system 14 is shown as including a "Mirroring Group" G01, comprising disk storage units 20, including a master storage disk unit $20_1$ and mirrored disk storage units $20_2, \ldots, 20_3$. It will be evident to those skilled in this art that the number of disk storage units 20 can be anything appropriate within the design and operating capabilities of the storage system 14.

Disk storage units 20 are preferably grouped in "Mirroring Groups." The disk storage units 20 are shown as having membership in the Mirroring Group G01. And, while only one Mirroring Group is illustrated in FIG. 1, to preclude confusion from unnecessary complexity, it will be apparent, and in some instances preferable, to have more than one Mirroring Group. If more than one Mirroring Group is used, those implementing mirroring according to the present invention will have one disk storage unit designated as the master disk storage unit, comparable to the master disk storage unit $20_1$ of the Mirroring Group G01, and one or more mirrored disk storage units comparable to the disk storage units 20. The following discussion will refer to more than one Mirroring Group to show how the disk storage units of two or more Mirroring Groups are managed by the storage system 14.

The disk storage units 20 are controlled by a disk controller 22 that communicatively connects to the disk storage units 20 by an I/O bus 24. Although not specifically shown, it will be appreciated by those skilled in this art that the disk controller 20 will include the necessary processor elements (e.g., microprocessors) and associated devices (e.g., memory) for the requisite intelligence needed to handle I/O read and write requests submitted by the server processors 12. As will be seen, the disk controller, with the help of the Mount Manager $12_1$, manages the data that is to be written to and read from the disk storage units 20. All I/O write requests are honored by first writing that data to the master storage disk $20_1$ and then copying that same data to the mirrored disk storage units $20_2, \ldots, 20_3$, thereby providing multiple copies of data for ready and parallel access to the server processors 12.

The Mount Manager $12_1$ is responsible for establishing the Mirroring Group, or Mirroring Groups as the case may be, in response to supervisory (i.e., human) input. That input may be by conventional fashion (i.e., through a keyboard or some other input device, or combination of input devices and an application program, to construct appropriate data structures). In addition, the Mount Manager $12_1$ also allocates a disk storage unit 20 to each of the server processors 12. For example, it may allocate mirrored disk storage unit $20_3$ to server processor $12_2$ and mirrored disk storage unit $20_2$ to server processor $12_3$, or vice versa. However, as indicated above, although the storage system 14 stores data on the disk storage units 20 in replicated form, data is written first only to the master disk storage unit $20_1$. That data is subsequently copied to the mirrored disk storage units 20 of that Mirroring Group, e.g., mirrored disk storage units $20_2$ and $20_3$ (for Mirroring Group G01) only after written to the master disk storage unit $20_1$.

Each server processor 12 will be provided the address of the Mount Manager $12_1$ by conventional methods, such as by pre-configured information in a local file system or by access to a network information service (NIS), a centralized database on an intranet (e.g., the network structure 11).

Initially, such as when a server processor 12 first boots and is initialized, it will send a "Mount Point Request" to the Mount Manager $12_1$, in effect, applying for assignment of a disk storage 20 for I/O read requests. In response, the Mount Manager $12_1$ will allocate one of the disk storage units 20 to the requesting server processor 12. In this manner the I/O read request load imposed upon the storage system 14 by the server processors 12 is distributed across the disk storage units 20. Also, each of the server processors 12 will have resident a file system process 13 and a mount daemon ("mountd") 15. The file system process 13 is used by each server processor 12 to "mount" (i.e., initialize, etc.) the disk storage unit 20 that has been allocated that server processor. The mount daemon, mountd, 15 is used by a server process 12 to query the Mount Manager $12_1$ for the identification of the disk storage unit to mount through the Mount Point Request. Also, if a mirrored disk storage 20 unit fails, the server processor 12 to which that now-failed disk storage unit has been allocated, will use the mountd to request allocation of replacement disk storage unit 20. The file system process 13 also operates to process file level I/O requests issued by application programs running on the server processor—as is conventional, and in conventional fashion. The file system process 13 translates a file level I/O requests from application programs for retrieving the requested data from the allocated mirrored disk storage unit 20.

Data normally is read only from the that mirrored disk storage unit 20 assigned or allocated to the server processor 12 issuing the I/O read request. However, if the requested data has changed on the master disk storage unit $20_1$ before the mirrored disk storage unit to be read has been updated to reflect that change, it will be the master disk storage unit $20_1$ that is accessed for that data. In order to have available such information (1) as the identity of the master disk storage unit in order to be able to distinguish it from the mirrored units, or (2) to be able to determine which disk storage units have membership in which Mirroring Group (if there are more than one), or (3) to be able to identify which mirrored disk storage unit is assigned to which server processor 12, or (4) to track the freshness of data on the mirrored disks 20 a number of data structures are created and maintained by the server processors 12 and the storage system 14.

Figure 2:
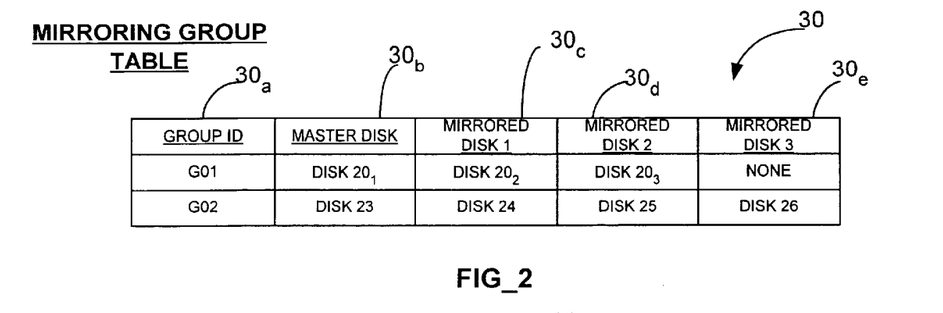
FIGS. 2–7 illustrate data structures maintained by the various elements of the system illustrated in FIG. 1 to primarily track fresh and stale data on the mirrored disk units.
Figure 3:
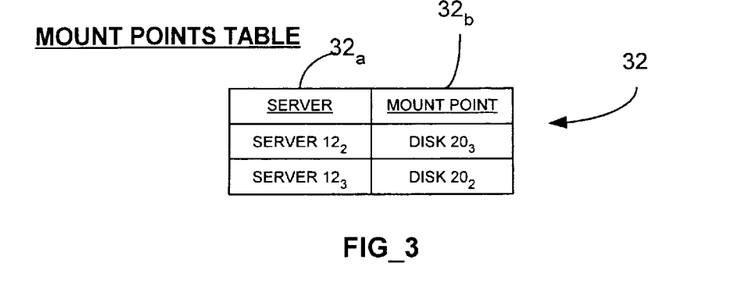
Figure 4:
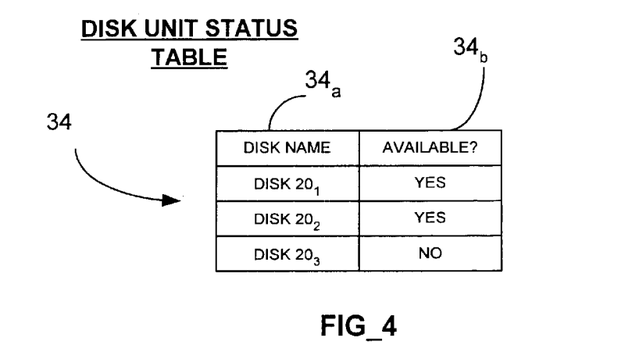

Accordingly, turning now to FIGS. 2–4, there are shown three data structures: a Mirroring Group Table 30 (FIG. 2), a Mount Points Table 32 (FIG. 3), and a Disk Unit Status Table 34 (FIG. 4) that are created and maintained by the Mount Manger $12_1$. The Mirroring Group Configuration Table 30, shown in FIG. 2, identifies each mirroring group of the storage system 14 as established by the Mount Manager $12_1$, including the makeup of that mirroring group, i.e., the number of disk storage units, their addresses, and which is designated as the master and which are the mirrored units. Thus, as FIG. 2 illustrates, column $30_a$, labeled "Group ID," identifies each Mirroring Groups established for and managed by the storage system 14 (FIG. 1). Here, there is shown the identification of the Mirroring Group G01, shown in FIG. 1, and if a second Mirroring Group is established for the storage system 14 (as assumed here for illustrative purposes), its identification, G02. To the right are additional columns, $30_b$, . . . , $30_e$, identifying the disk storage units of the Mirroring Group or Groups and their designations. Thus, the column "Master Disk" ($30_b$) identifies the master disk storage of Mirroring Group G01 as "Disk $20_1$;, the columns $30_c$, "Mirrored Disk 1," $30_d$, "Mirrored Disk ( )," and $30_e$ "Mirrored Disk 3 ( )," etc., identify the mirrored disk storage units of the Mirroring Group G01 as disk storage units $20_2$ and $20_3$, indicating also that there is no "Mirrored Disk 3 for that Mirroring Group. In addition the Mirroring Group Table 30 shows the makeup of a Mirroring Group G02 (shown here for illustrative purposes only; not shown in FIG. 1) as including a master disk storage unit identified as DISK 23, and three mirrored disks identified as DISK 24, DISK 25, and DISK 26.

The Mount Points Table 32 (FIG. 3) provides the information as to which disk storage unit 12 has been assigned to which server processor 12 for the particular Mirroring Group. If there are more than two Mirroring Groups, there would be a separate Mount Points Table for each such group. FIG. 3 illustrates the Mount Points Table for the Mirroring Group G01, showing that the server processor $12_2$ (server column $32_a$) has been allocated use of the mirrored disk storage unit $20_3$ (Mount Point column $32_b$), and that server processor $12_3$ has been allocated the services of the mirrored disk storage unit $20_2$.

The Disk Status Table 34, shown in FIG. 4, provides information of the availability of each disk storage unit 20 of a Mirroring Group. The "Disk Name" column $34_a$ identifies the disk storage unit, and the "Available?" column $34_b$ identifies its status, i.e., availability. Thus, FIG. 4 illustrates the situation in which one of the disk storage units 20, unit $20_3$, has failed, or has been removed from the storage system 14, and is therefore identified and being unavailable by the "No" in column $34_b$. The mountd of each server processor 12 will, when detected, report failure of the allocated disk storage unit 20 to the Mount Manager $12_1$. If an administrator of the system 10 later repair the failed disk storage unit $20_3$, and/or replaces it in the storage system 14, the disk status table will be updated by the administrator manually to reflect that the disk storage unit $20_3$ is now available. As FIG. 4 further illustrates, the Disk Unit Status Table 34 shows the disk storage units $20_1$ and $20_2$ as up and running, i.e., available.

Figure 5:
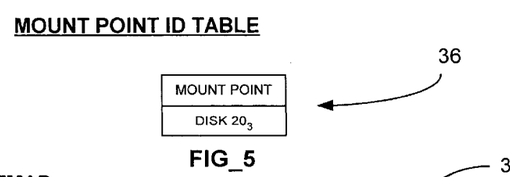

Turning now to FIG. 5, there is shown a Mount Point ID Table 36. Each server processor 12 maintains a Mount Point ID Table 36 for identifying which disk storage unit 20 has been allocated that server processor 12. For example, The Mount Point ID Table 36 is what would be maintained by the server processor $12_2$, showing (in agreement with the Mount Points Table 32, maintained by the Mount Manager $12_1$) that the disk storage unit $20_3$ has been allocated. The server processor $12_3$ would have a similar Mount Point ID Table, showing that it had been assigned disk storage unit $20_2$.

Figure 6:
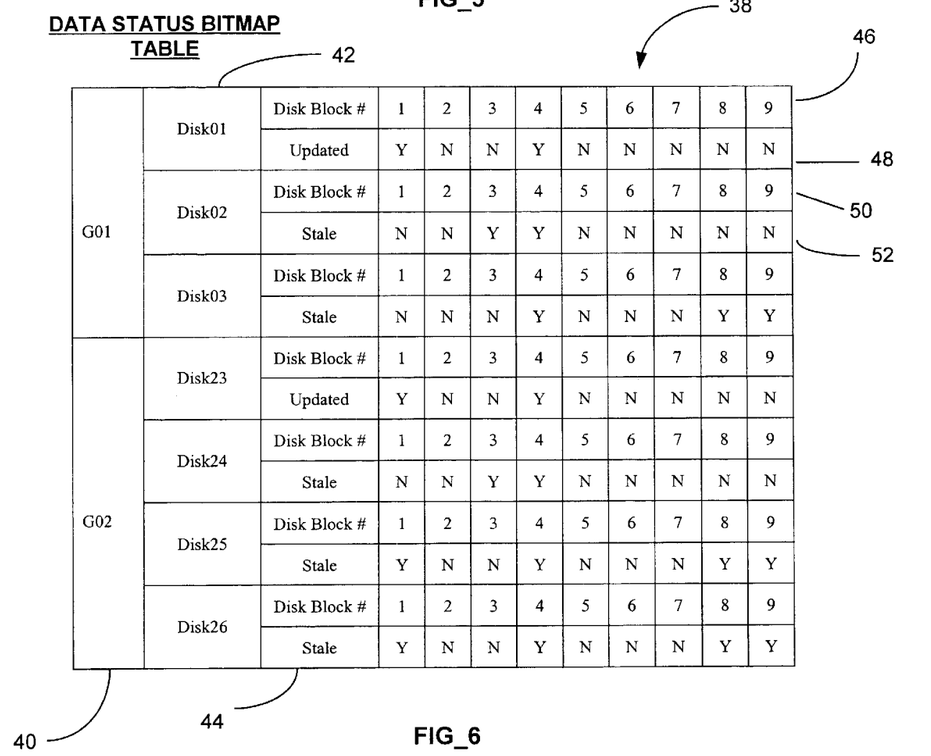

FIG. 6 is a Data Status Bitmap Table for mirrored data that is created and maintained by the storage unit 14. The Figure assumes there are two Mirroring Groups (Mirroring Group G01 of FIG. 1 and the hypothetical Mirroring Group G02) for purposes of illustration, rather than just the one shown in FIG. 1. Beginning at the far left of FIG. 6, the first (left most) column 40 of the bitmap identifies the Mirroring Groups within the storage system 14: Here, there are only two mirroring groups identified: Mirroring Groups G01 and G02. Moving to the right, the next column 42 identifies, for each mirroring group, the disk storage units within the corresponding mirroring group. The next column 44, immediately to the right, serves to label the rows that extend to the right, for example rows 46 and 48, corresponding to "Disk01" in column 42 and rows 50, 52, corresponding to "Disk02" in column 42.

The Data Status Bitmap Table 38 of FIG. 6 is a data structure that provides information as to whether or not data written to or otherwise modifying that held by the master disk storage unit $20_1$ has been copied to the mirroring disk storage units $20_2$ and $20_3$. For the master disk storage unit $20_1$, which has an address of "Disk01," the row 46 identifies each data storage block of the disk, and the row 48 identifies, for each block, whether all corresponding mirroring blocks have been updated; that is, if data in Disk Block 3 has been re-written or otherwise modified, that block will need to be copied to the corresponding Disk Block of the mirroring disk storage units $20_2$ and $20_3$. Accordingly, if the data held by Disk Block 1 of the master disk storage unit $20_1$ has at some time been changed, the "Y" in the "Updated" row for Disk Block 1 indicates that the change has been copied to the mirroring disk storage units $20_2$ and $20_3$. Conversely, the "N" for Disk Blocks 2 and 3 and 5–9 indicate that data in those disk blocks of the master disk storage unit has changed, and that change has not yet been completely reflected at the mirroring disk storage units $20_2$ and $20_3$.

Rows 50, 52 show the status of data stored on the disk storage device of Mirroring Group G01 with the address of "Disk02," i.e., disk storage unit $20_2$. Thus, as FIG. 6 illustrates by rows 50, 52, the disk storage unit $20_2$ has "stale" data in Data Blocks 3 and 4. All the other data blocks have data that has been synchronized with that held in the corresponding disk blocks of the master disk storage unit $20_1$. The remainder of the Data Status Bitmap Table contains similar information for the disk storage unit $20_3$, as will for the disk storage units of the hypothetical Mirroring Group G02 (in which the disk storage unit having an address of DISK23 is designated the master). As will be seen, the information provided by the Data Status Bitmap Table is used when an I/O read request is received by the storage system 14 to determine if the requested data is fresh, or should be read from the master disk storage unit $20_1$, which will always have the most up-to-date data.

Figure 7:
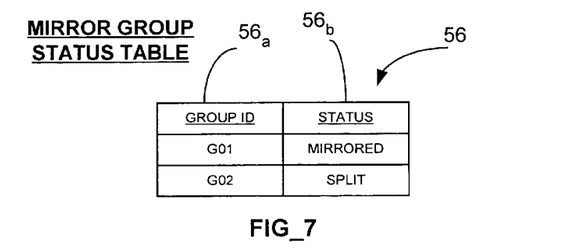

FIG. 7 shows a Mirroring Group Status Table 34 that is also maintained by the storage unit 14. A Mirroring Group can have one of two status: "Mirrored" or "Split" The Mirrored and Split status pertains to whether or not data has been "fixed," a term that is pertinent to an embodiment of the invention described below. Basically, if the data has been fixed at a particular time T, then the server processors 12 are unable to read that data if it has been undated subsequently. They can, however, read data updated before the time T. When there has been an update of data after the time T, the status of the associated mirroring group is referred to as "Split." Conversely, a non-Split mirroring group is mirrored, i.e., since data carried by the master disk storage unit $20_1$ has been copied to each of the other disk storage units $20_2$, $20_3$ of the mirroring group, any server processor 12 can access the same data stored on the master disk through any mirrored disk storage unit.

Figure 8:
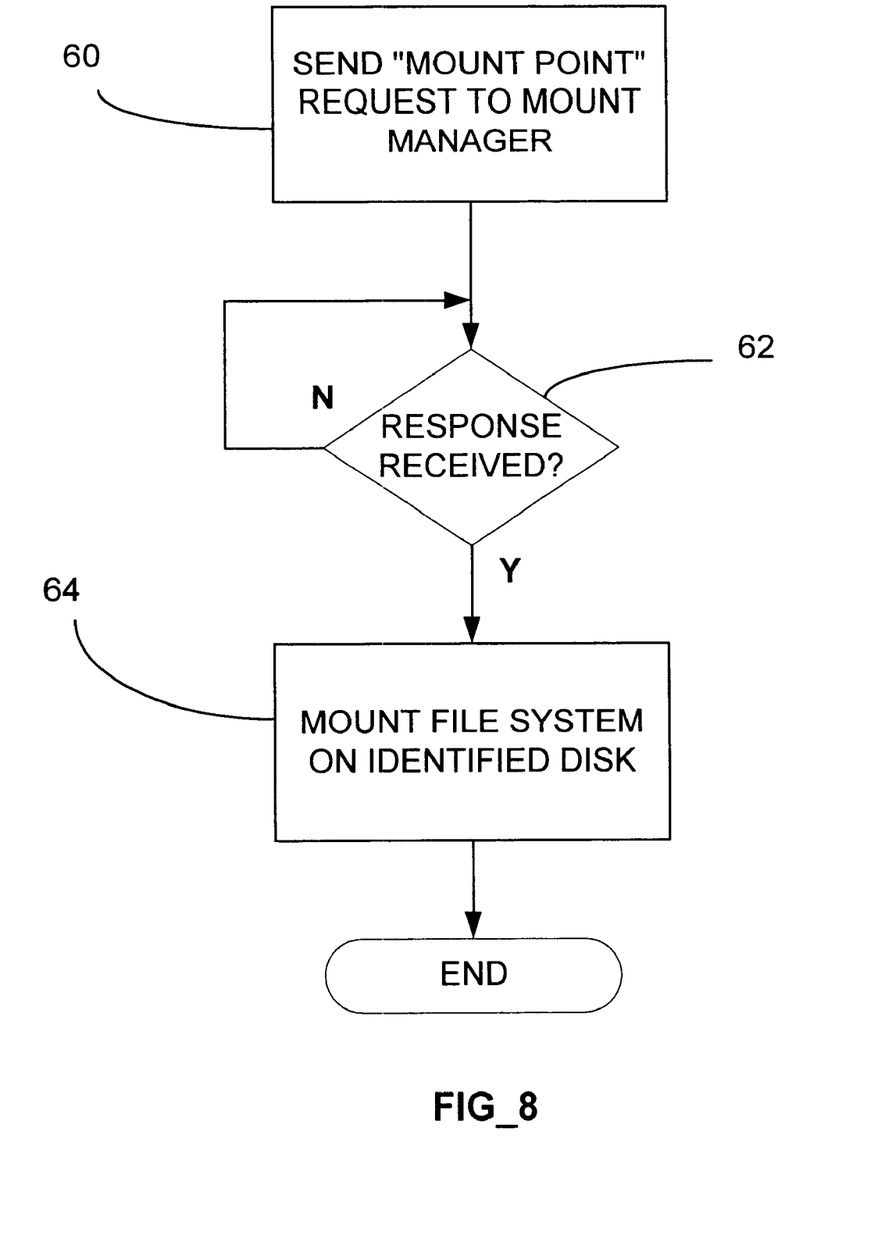
FIG. 8 is a flow diagram that illustrates the steps taken to assign a one of the disk mirrored units to a server processor for read operations.

Turning now to FIG. 8, illustrated in flow diagram form are the major steps taken by a server processor 12 during its boot period when coming on-line. As FIG. 8 shows, among the first steps taken is step 60 in which the server processor sends a Mount Point message to the Mount Manager and, in step 62, waits for a response. The Mount Manager will pick one of the mirrored data storage units 20, and return the address of that data storage device, in step 64, to the requesting server processor 12.

Figure 9:
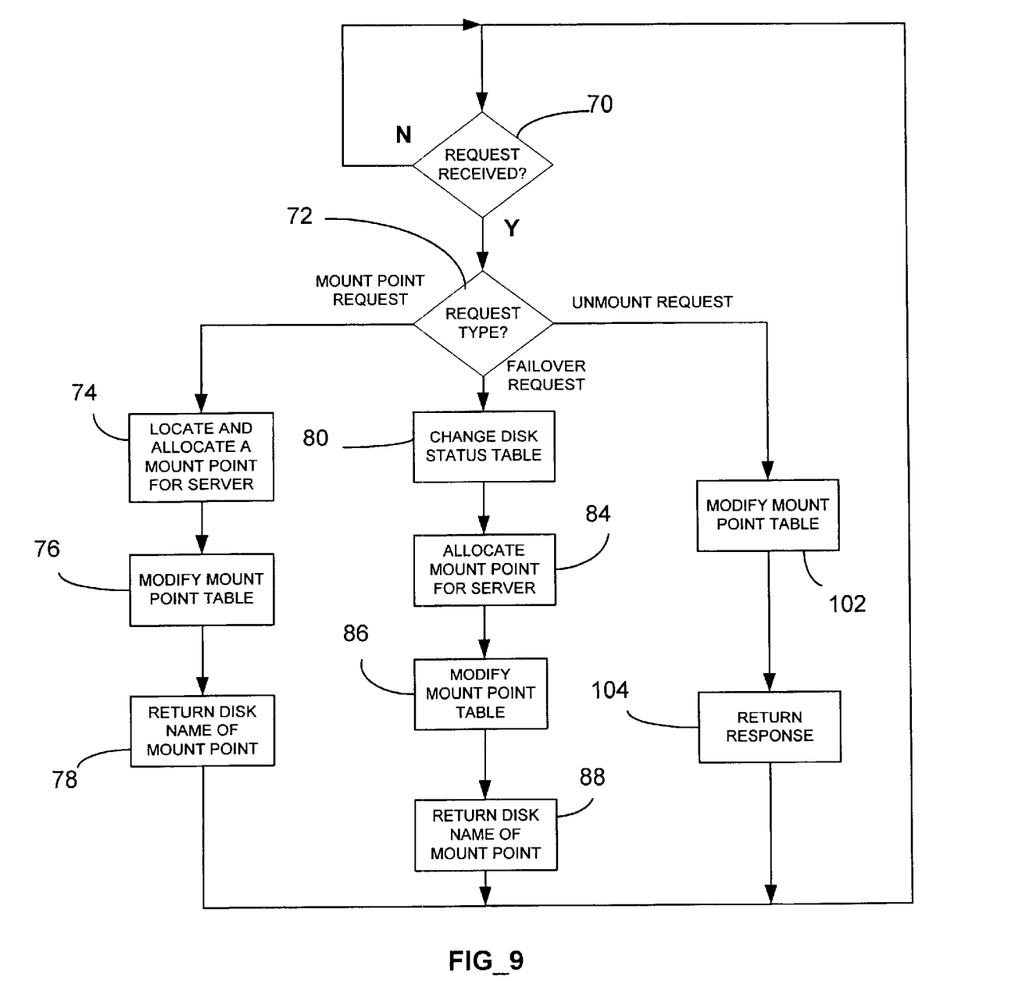
FIG. 9 is a flow diagram illustrating operation of the Mount Manager.

FIG. 9 illustrates the operational steps taken by the Mount Manager $12_1$ insofar as the present invention is concerned. As FIG. 9 shows, the Mount Manager $12_1$ will wait, at step 70, until it receives a request from one of the other server processors 12. When a request is received, it is checked, in step 72, to see what the type, i.e., is it (1) a Mount Point request sent by a server processor to have one of the data storage units allocated to it for I/O read operations; (2) a failover request, or an "Unmount" request. Failover requests may be sent to inform the Mount Manager that the allocated disk storage unit 20 has failed, requesting to have another allocated. An Unmount request is part of a shutdown process performed by a server processor when it is going or is being taken off-line.

If the request is a Mount Point request, step 72 is exited in favor of step 74, where the Mount Manager $20_1$ first determines which disk storage units 20 are available, and then chooses one as the "Mount Point" for allocation to the requesting server processor 12. Then, in step 76, the Mount Manager $20_1$, will update the Mount Points table (FIG. 3) to have it reflect that allocation, and in step 78 send the identification of the allocated disk storage unit to the requestor server processor 12. The process then returns to step 70 to await another request.

If, on the other hand, the Mount Manager $12_1$ receives a Failover Request from one of the server processors 12, indicating that the disk storage unit 20 allocated the requesting server processor has failed or is otherwise no longer available. For this type of request, step 72 is exited in favor of stop 80 where the Mount Manager $12_1$ will first change the Disk Unit Status Table (FIG. 4) so that it reflects loss and, therefore, unavailability of the disk storage unit 20 in question. Then, in step 84, using the Disk Unit Status Table, the Mount Manager will select another disk storage unit 20 from those identified by the Table as being available for allocation to the requesting server processor 12. In step 86, the Mount Points Table (FIG. 3) is modified by the Mount Manager $12_1$ to reflect this new allocation. Finally, in step 88, the Mount Manager will return the identification of the allocated disk storage unit 20 to the requesting server processor 12, and returns to step 70.

Figure 10:
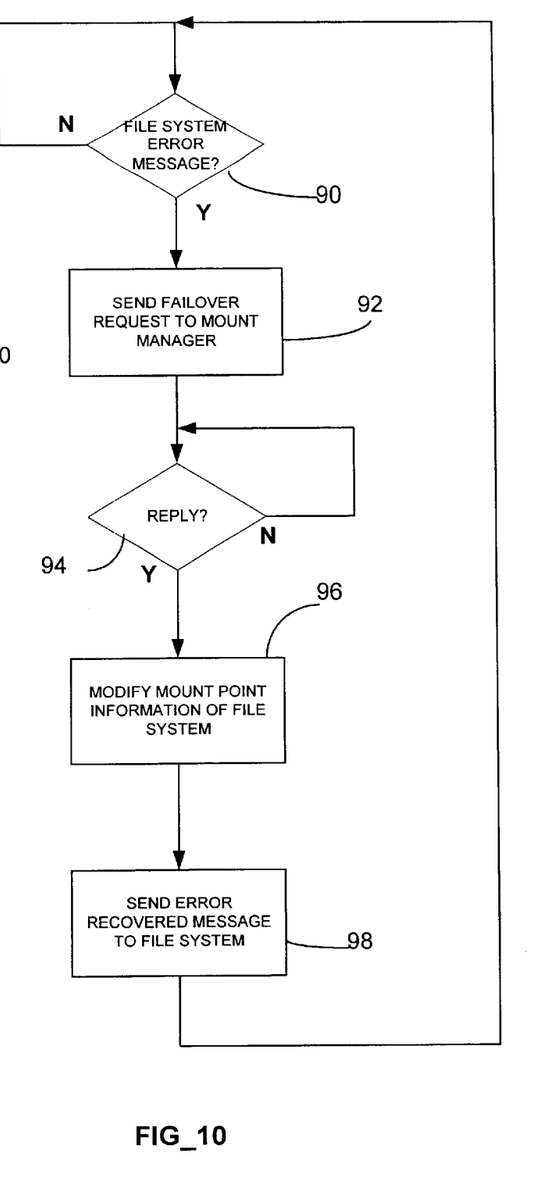
FIG. 10 is a flow diagram illustrating the steps taken to failover a disk unit that has been found by a server processor to have failed.

At the server processor end, the failover process is conducted as broadly illustrated in FIG. 10. As shown, a server processor 12 will get its first indication of a problem with its allocated disk storage when, at step 90, an error message from the file system, indicating that an error has been received in connection with an I/O read request. The error message will further indicate that the allocated disk storage unit 20 has failed. If such an error is received, the receiving server processor 12 will send a failover message to the Mount Manager $20_1$ in step 91, and, in step 94, wait for the response from the Mount Manager $12_1$ that will contain the name/address of the newly allocated disk storage unit 20 (sent in step 88 of the Mount Manager process—FIG. 9). When that response is received with the identification of the newly-allocated disk storage unit 20, replacing the one that failed, the server processor will modify its own Mount Point information (the Mount Point ID Table—FIG. 5) and send the local file system a message with the identification of the newly allocated disk storage system is steps 96 and 96, respectively.

Returning to the Mount Manager process of FIG. 9, if the request is determined, in step 72, to be an "Unmount" request, the server processor 12 sending the request is, in effect, asking that its allocated disk storage unit 20 be de-allocated. The purpose of these series of steps (i.e., steps 102–104 that handle the Unmount request) is to free up the disk storage unit so that it can be allocated to another server processor if need be, thereby distributing I/O read loads across all disk storage units of the particular mirroring group. Thus, in step 102, the Mount Points Table (FIG. 3) is modified to delete reference to the server processor and its connection to the allocated disk storage unit 20. Finally, is step 104, the Mount Managers sends a message in response to the Unmount request to notify the requesting server processor 12 that the unmount has been completed.

Figure 11:
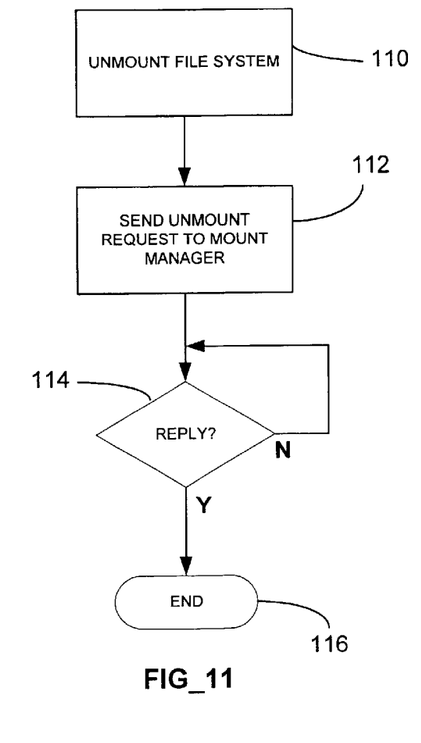
FIG. 11 is a flow diagram that illustrates the steps taken to shut down a server processor.

In connection with the unmount request sent to the Mount Manager, the server processor sending the request perform the steps illustrated in FIG. 11, beginning with step 110 in which the server processor in question will unmount the file system. Next, at step 112, a mountd process running on the server processor 12 in question will send an "unmount" request to the mount manager processor 12, (FIG. 1). In response the mount manager processor $12_1$ will modify the mount point table (see step 102, FIG. 9, discussed above) and return to the server processor a reply with a shut-down instruction. The server processor 12 will, in step 114, wait for the reply to the unmount request sent, and when received the server processor will leave step 114 to shut down in step 116.

Figure 12:
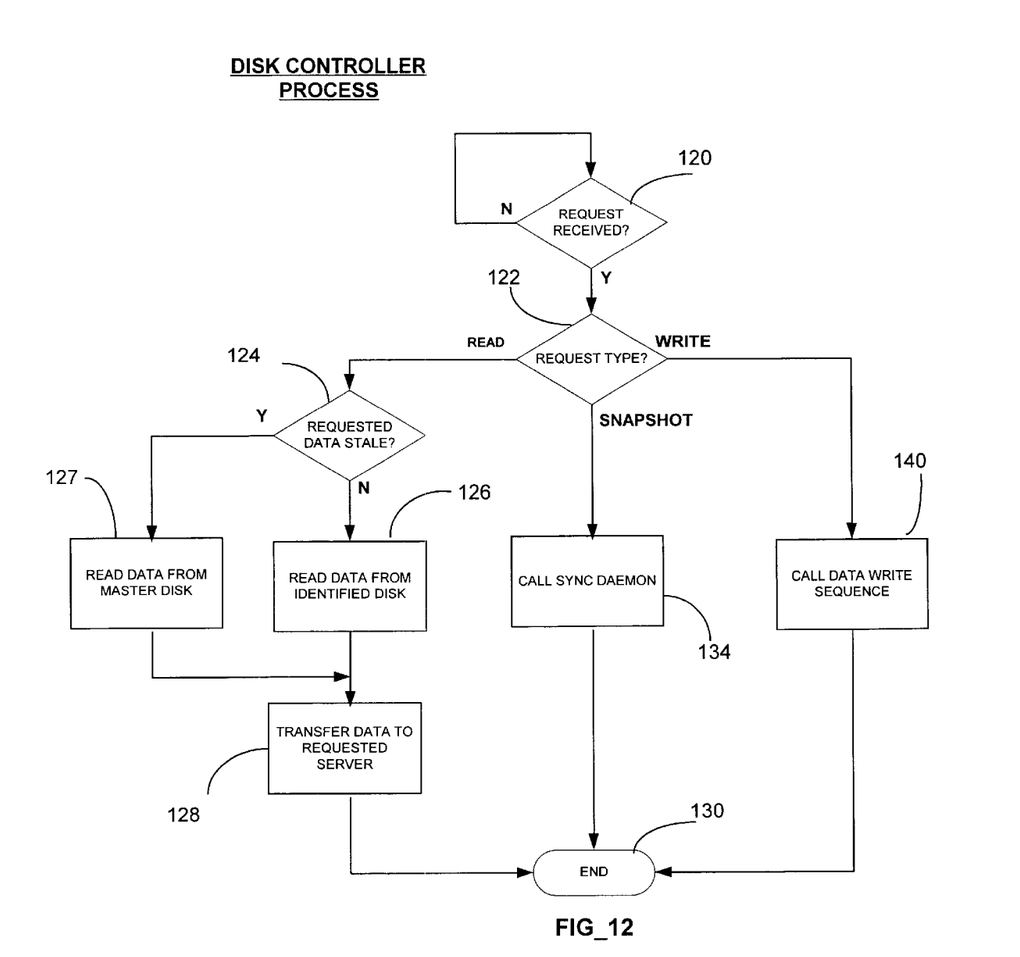
FIG. 12 is a flow diagram illustrating the steps taken by the storage system of FIG. 1 when an I/O request is received.

FIG. 12 illustrates the steps taken by an I/O request handling process of the storage system 14 in response to requests for disk operations such as I/O read and write requests. The steps illustrated in FIG. 12 are performed by the disk controller 22, and begin with step 120 when an I/O request is received, moving the process to step 122 where a determination of which of three requests have been received: read, write, or "snapshot." The snapshot request is discussed further below in connection with a second alternate embodiment of the invention. An I/O read or write request will identify, by disk address and block identification, where the data is to be read from or written to. An I/O write request will also contain or be accompanied by the data to be written. I/O read requests identify the disk storage unit allocated the requesting server processor, and are transferred to step 124 where, using the address of the requested data, the Data Status Bitmap and Mirror Group Status Tables 38 and 56 are consulted to determine first (from the Mirror Group Status Table) whether the Mirroring Group containing the requesting server processor is in the "Mirrored" or "Split" state. The Split state of a Mirroring Group is discussed below in connection with explanation of the alternate embodiment of the invention. For now, we will assume that the requesting server processor 12 is a member of a Mirroring Group whose status is mirrored. Thus, after checking the Mirror Group Status Table 56 and determining the status of the Mirroring Group as being mirrored, the Data Status Bitmap Table 38 is consulted to determine whether the data requested is in an updated state, or if it is stale. For example, referring for the moment to FIG. 6, assume that the address of the data to be read is identified as being contained in mirroring group G01, Disk02, Disk Block 2. As FIG. 6 indicates in row 52, there is an "N," identifying that the requested data is not stale, and, therefore, step 124 (FIG. 12) will be exited in favor of step 126 where the data is read from the identified disk storage unit 20 and, in step 128, transferred to the requesting server processor 12. The request handling process then concludes with step 130.

On the other hand, assume the address of the requested data is mirroring still mirroring group G01, Disk02, but now Disk Block 3. As the Data Status Bitmap Table 38 of FIG. 12 indicates by the "Y" for that address, the data is stale. Accordingly, this time step 124 will be exited for step 127 where the requested data is read from the master disk storage unit of that mirroring group (i.e., G01), and, in step 128, transferred to the requesting server processor 12, again concluding with step 130.

Assume now that the request received in step 120 is an I/O write request. This time step 122 will transfer the request to step 140 where a Data Write Sequence (described below) is called, followed by the concluding step 130.

Figure 13:
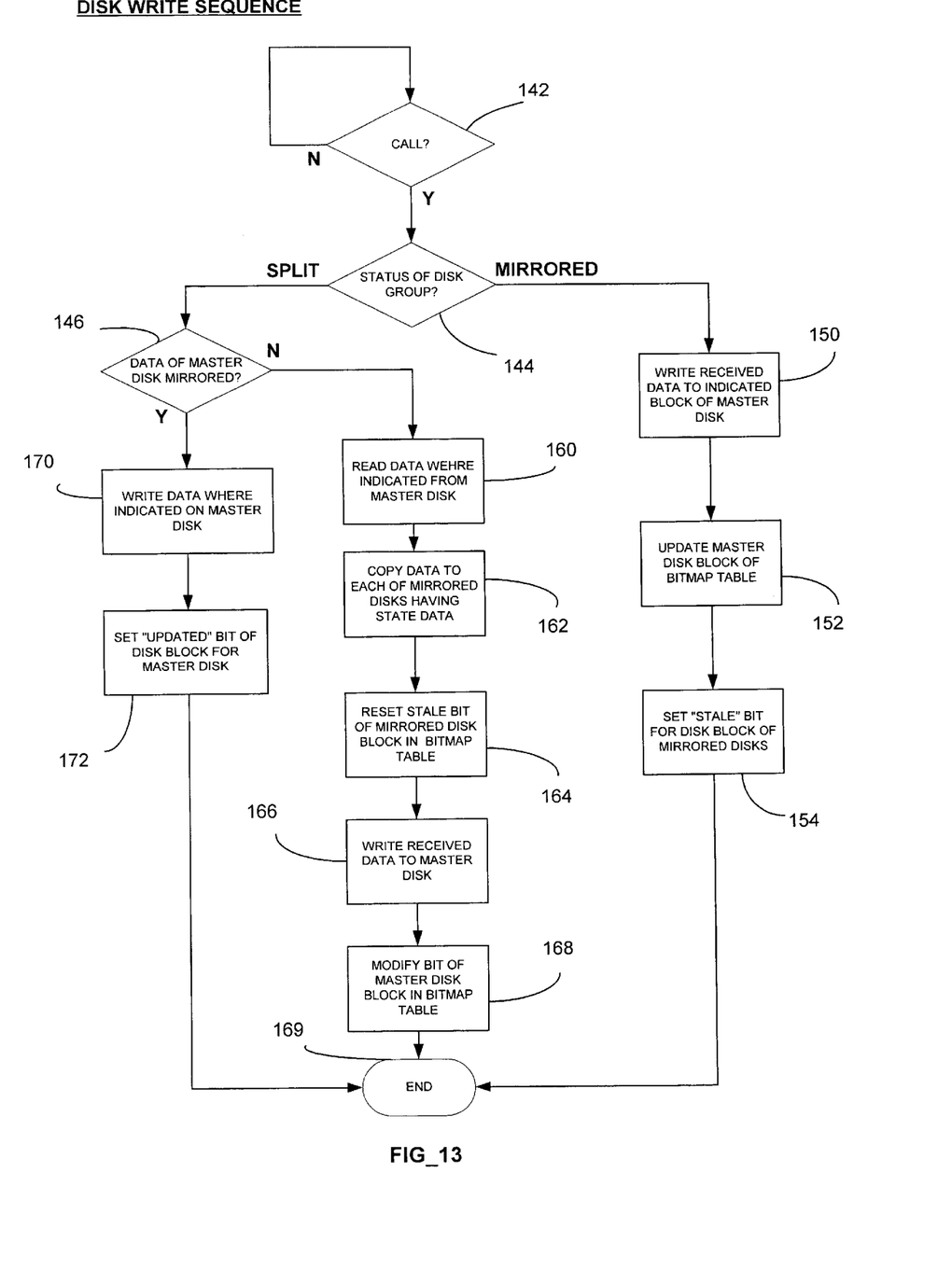
FIG. 13 is a flow diagram that illustrates the steps taken by the storage system to perform a write operation.

The major steps taken for the Data Write Sequence is broadly illustrated in FIG. 13. The Sequence begins with step 142, when the call (e.g., as may be made by step 140 of the disk controller process; FIG. 12), together with the I/O write request, is received. The request is transferred to step 144 where, using the identification of the mirroring group containing the disk storage unit to be written, the Mirror Group Status Table (FIG. 7) is consulted to determine the state of the mirroring group i.e., whether a mirrored or a Split state. If in a mirrored state, step 144 leads to step 150; if not, step 144 will transfer the request to step 146.

Assume the disk storage unit to be written is in mirroring group G01 which, as the Mirror Group Status Table of FIG. 7 indicates, is in the mirrored state. Accordingly, the determination made in step 144 will lead to step 150 where the data of the request is written to the master disk storage unit of the identified mirroring group, here, disk storage unit $20_1$. Then, in step 152, the Data Status Bitmap Table (FIG. 6) is updated to reflect the newly-written data by setting the bit for the written disk block of the master disk (identified as Disk01 in FIG. 6) to a state that specify the update with a "Y." Next, in step 152, the corresponding disk blocks containing mirrored data for the other mirror disk storage units (e.g., here disk storage units $20_2$ and $20_3$) are set to a state ("N") to reflect that the particular disk block does not match the corresponding disk block of the master disk storage unit of that mirroring group.

To illustrate, assume that Disk Block 1 of Disk01, mirroring group G01 was written in step 150. The "Updated" bit for Disk Block 1 (Disk 01, mirroring group G01) is set to a "Y" state to indicate that update. Then, in step 154, the "Stale" bits for the corresponding Disk Blocks of the mirroring disks (Disk02 and Disk03) are set to "N" to indicate that they now contain stale data needing updating.

Running in the background on the disk controller 22 is the Sync Daemon 26 (FIG. 1), which periodically checks the Data Status Bitmap Table to see if the mirrored data matches that of the master disk storage unit of each mirroring group. Thus, ultimately, after the above described write, the Sync Daemon 26 will check Data Status Bitmap Table to find that the "Updated bit for Disk Block 1 of Disk01 (mirroring group G01) indicates that the data was updated, and that the corresponding mirrored Disk Blocks, being set to "N," need updating. Accordingly, the Sync Daemon will write the data (which preferably has been cached) to the Disk Blocks 1 of the mirrored disk storage units, and reset the bits to a "Y" to indicate they no longer need updating, and that the data there matches the corresponding data on the master disk storage unit of that mirroring group.

Figure 15:
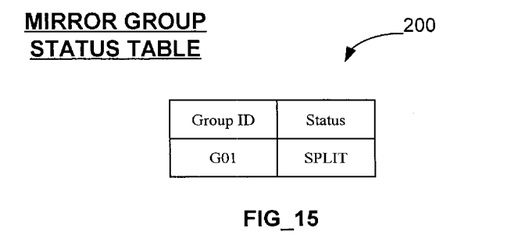
FIG. 15 is the Mirror Group Status Table for Split mode of operation of an embodiment of the present invention.

The Split state of a Mirroring Group has to do with the alternate embodiment of the present invention, which limits access to the master disk storage unit $20_1$ even in instances when the master disk storage unit 201 carries data more up to date than that of the mirrored disk storage. To understand the Split state, assume that the Mirroring Group G01 is in a Split state, rather than mirrored, state. This is illustrated by the Mirroring Group Status Table 200 shown in FIG. 15. (FIG. 15, and the remaining FIGS. 16A–16C discussed below refer only to a single Mirroring Group, G01, and show that Mirroring Group as containing only two disk storage units 20: the master disk storage unit $20_1$ and a mirror disk storage unit $20_2$ with respective addresses identified as "Disk 01" and "Disk 02." The purpose of this is to refrain from unduly complicating the discussion of this second embodiment of the invention.)

Figure 16A:
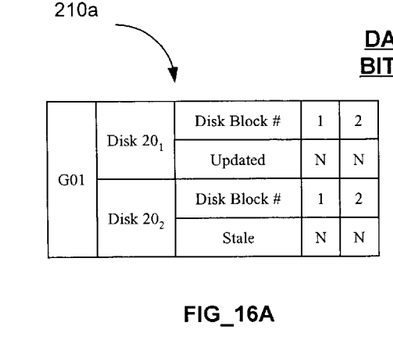
FIGS. 16A, 16B, and 16C illustrate the changes made to the Data Status Bitmap Table to reflect changes of data on the master disk storage unit.

FIG. 16A illustrates a Data Status Bitmap Table 210a the represented system in some initial state, showing the mirroring group G01 as including two disk storage units: the master disk storage unit $20_1$ and the mirrored disk storage unit $20_2$. Also, the Data Status Bitmap Table 210a indicates that the data carried by the mirrored disk storage unit is assumed to be "fixed," i.e., the data is valid and can be used for responses to I/O read requests for that data. The Data Status Bitmap Table 210a further indicates that the disk Blocks 1 and 2 of the master disk storage unit (Disk $20_1$) has not been updated since being mirrored at Disk Blocks 1 and 2 of the mirroring disk storage unit (Disk $20_2$). How the storage system 14 "fixes" mirrored data will be discussed below in connection with the storage system's response to a Snapshot request from a server processor 12.

Now, assume that one of the server processors 12 sends an I/O write request to the storage system 14 for data to be written to Disk Block 1 of the master disk storage $20_1$. Referring for the moment to FIG. 12, steps 120 and 122 will find that the received request is one for writing data, and pass the request to step 140, which calls the data write sequence shown in FIG. 13. Then, as FIG. 13 shows, the call is received by step 142, passed to step 144 where the controller 22 examines the Mirror Group Status Table 200 (FIG. 15) and sees that the Mirroring Group containing the disk storage unit to which the request is directed is in a Split state. Accordingly, the request is passed to step 146 where the Data Status Bitmap Table 210a (FIG. 16A) is checked. Seeing that the data then held at Disk Block 1 is mirrored (i.e., by the "N" in the updated box for Disk $20_1$ to indicate that the data has not been updated recently, and the "N" in the corresponding Disk Block for the Disk $20_1$ to indicate that the corresponding data is not stale), step 146 is left in favor of step 170 where the data is written to Disk Block 1 of the master disk storage unit $20_1$ Then, in step 172, the "updated" bit in the Mirror Group Status Table 200 is changed to a "Y" to indicate that data has been written, but not yet mirrored.

Figure 16B:
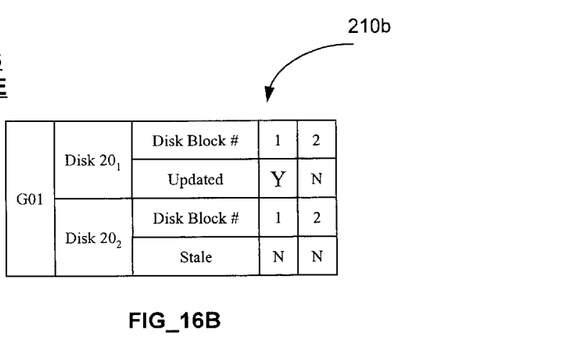

As a result of this write operation, the state of the new Data Status Bitmap Table, after step 172, is changed as to that shown in FIG. 16B. As can be seen, the field for Disk $20_1$, Disk Block 1, is set to a "Y," indicating that the data in that block has changed or been modified. That, together with the "N" in the Disk $20_1$, Disk Block 1 field, indicates that even if the data carried by the master disk storage has been updated, the corresponding space on the mirrored disk storage is different, but still valid.

Next, assume that the disk controller 14 receives an I/O read request from one of the servers 12, requesting data stored on mirrored disk, Disk $20_1$, Data Block 1. Returning to FIG. 12, steps 120 and 122 will pass the request to step 124. There, the process will determine that the requested data is still indicated as being not stale, i.e., it is valid, by the "N" in the Staled field of FIG. 16B for Disk 02, Disk Block 1. Thus, the requested data will be read and passed to the requesting server processor 12. In fact, this is a "fixed" state, as will become apparent below.

Figure 14:
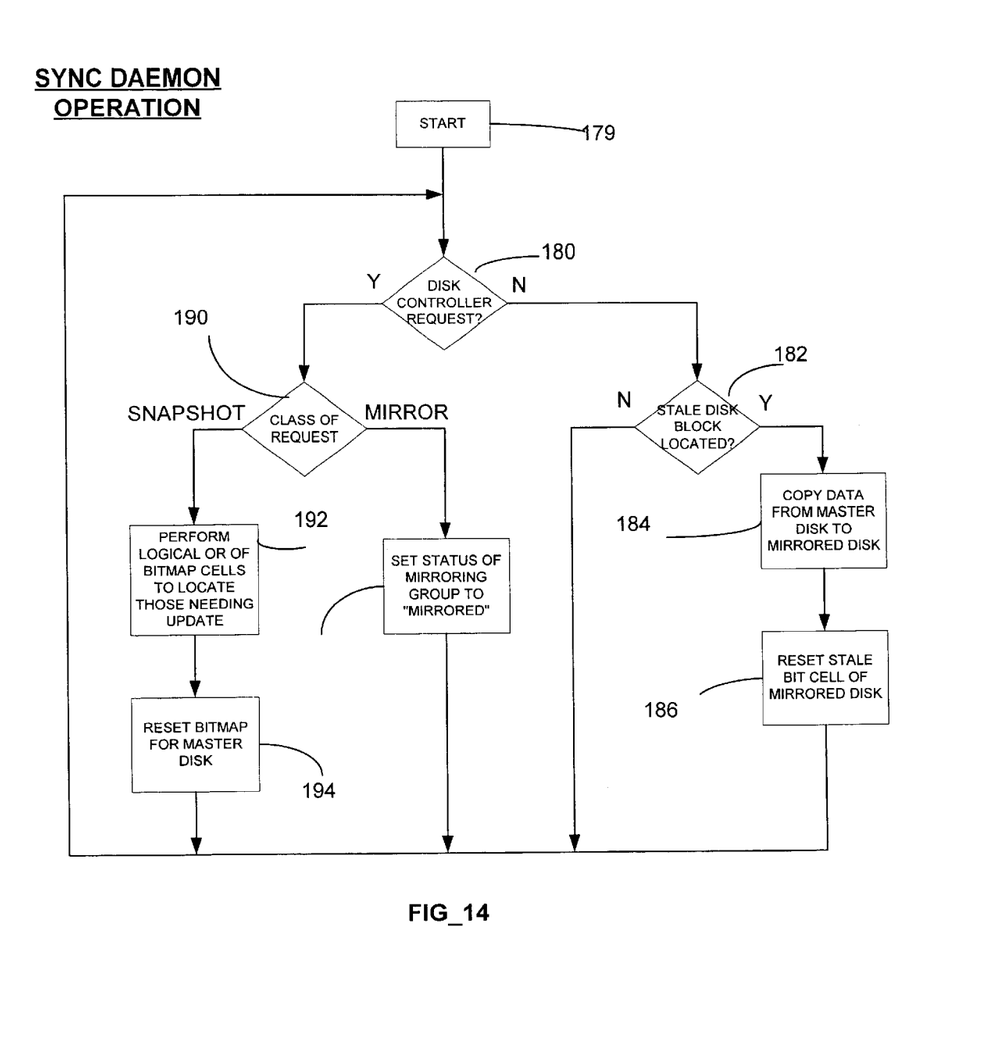
FIG. 14 is a flow diagram broadly illustrating the steps taken by the sync daemon to maintain copies of data written to the master disk storage unit of FIG. 1 to the mirror disk storage units.

Assume now that the I/O read request is followed by a Snapshot request being issued by one of the server processors 12 to the storage system 14. The disk controller 22, again in steps 120, 122 (FIG. 12), will check the request, find that it is a Snapshot request, and pass it to step 134 to execute a call, with the request, to the sync daemon. The sync daemon will, as illustrated in FIG. 14, receive the request in step 180, see that the request is through a call from the disk controller 22, and pass the request to step 190, where it is determined that it is a Snapshot request. Accordingly, the sync daemon operation will proceed to step 192 to, using the Data Status Bitmap Table 210b, perform a logical OR of the updated fields of the mirroring disk storage units for each Disk Block, with that of the master disk. Thus, there will be no change in the Updated and Staled fields for Disk Block 2 of the master and mirror disk storage units $20_1$ and $20_2$. However, since those fields are different for Disk Block 1 (Updated=Y for Disk Block 1 of Disk $20_1$, and N for Disk Block 1 of Disk $20_2$), the fields will, in steps 192 and 194, change to the values shown in the Data Status Bitmap Table 200c shown in FIG. 16C. All Updated fields of Disk $20_1$ are set to N in Step 194.

Some time later, the sync daemon will proceed on its own accord through steps 160, 162, 164, and 166 to locate those mirrored disk storage units that need updating, as described above. Finding the Y in the Stale field of Disk Block 1, address Disk 02, will effect copying of the updated data from the master disk storage (Disk Block 1, address Disk 01) to the mirror storage. The Y will then be reset to an N.

However, before the Disk Block 1 of the mirrored disk storage unit $20_2$ is updated, suppose an I/O read request is received, requesting mirrored data from Disk Block 1, address Disk $20_2$? When the I/O read request is received, as FIG. 12 shows, the disk controller will see that the request is a read request and, from step 122, pass the request to step 124. In step 124, the disk controller will consult the Data Status Bitmap Table 200c (FIG. 16C) and see that, by the Y, that the requested data is stale. Therefore, as was done above in connection with the Mirrored state of the Mirroring Group G01, the request will be passed to step 127 to read the requested data from the master disk storage unit $20_1$, i.e., the updated data stored at Disk Block 1, address Disk 01.

Figure 16C:
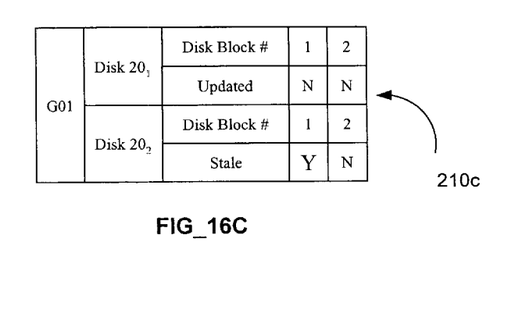

Consider now the situation involving an update of the master storage unit $20_1$ before the mirrored disk storage can be updated with the prior new or modified data. That is, assume data at Disk block 1 of the master disk storage unit $20_1$ is re-written or otherwise modified, but before a Snapshot request is received, another I/O write request is received to again update that same data. This is the situation existing with the Data Status Bitmap Table 200b (FIG. 16B) or 200c (FIG. 16C). Given either of these situations, when an I/O write request is received to write data to the Disk Block 1 of the master disk unit $20_1$, the request will first be handled by steps 120, 122, and 140 of the Disk Controller Process (FIG. 12), as described above, to make a call to the Disk Write Sequence shown in FIG. 13.

The Disk Write Sequence will determine in steps 142 and 144, and with reference to the Mirror Group Status Table 200, will see that the Mirroring Group to which the request is directed is in the Split state. And, in step 146, a check of the Data Status Bitmap 210b (FIG. 16B) for 210c (FIG. 16C) will show that the mirrored data has not yet been updated. Accordingly, before the data of the most recent request is written, the disk Write Sequence will proceed to step 160 where the data that will be over-written by the recent request is read from the master disk storage and, in step 162, copied to each mirrored disk storage unit (here, Disk Block 1 of disk storage unit $20_2$) requiring updating. Then, in step 164, the Data Status Bitmap 210b to 210c, as the case may be, is updated to reflect that the mirrored data is updated.

The data of the received request is then written to the master disk storage unit $20_1$ (step 166), the corresponding filed of the Data Status Bitmap for the master disk storage set to indicate once again that the master disk storage has an update that is not reflected in the mirrored storage, and the Sequence ends with step 169.

In conclusion there has been disclosed a storage system that operates to distribute I/O read requests across several disk storage units maintaining mirrored versions of earlier written data, thereby allowing concurrent access by multiple processors or servers. While a full and complete disclosure of the embodiments of invention has been made, it will be obvious to those skilled in this art that various modifications may be made. For example, if there are more processors than mirrored disk storage units, several processors can be assigned to the same disk storage unit, while the other processors enjoy exclusive use of other disk storage units. Also, the storage unit 14 can be configured to present to the processors logical disk drive units, each logical disk storage unit mapping to physical disk storage units. That means a logical disk storage unit can be constructed by several physical disk storage units. For example, suppose that the storage system comprises are two physical disk units x and y. A logical volume may be configured by mapping the address space of that logical volume to the concatenated address space of the two physical disk units x and y. Another example, is to have a logical volume that is mapped to a concatenation of some portion of the disk x and some portion of the disk y.

What is claimed is:

1. In a data processing system having a data storage system and a plurality of processor elements communicable to the data storage system, a data processing method comprising the steps of:

providing a first disk unit and a plurality of second disk units, each of the second disk units being a mirrored one of the first disk unit;

mounting by each of the processor elements, a corresponding one of the second disk units;

issuing by at least one of the processor elements, a write request to the first disk unit;

writing by the data storage system, write data associated with the write request to the first disk unit;

copying by the data storage system, data changed in the first disk unit to the second disk units; and issuing by each of the processor elements, a read request to the corresponding one of the second disk units.

2. The method of claim 1, wherein the copying is performed in response to a request from at least one of the processor elements.

3. A data storage system communicable to a plurality of processor elements, comprising:

a disk controller; and a first disk unit connected to said disk controller; and a plurality of second disk units connected to said disk controller, each of said second disk units being a mirrored one of said first disk unit;

wherein each of said second disk units are mounted by a corresponding one of the processor elements, wherein said disk controller receives a write request to the first disk unit from at least one of the processor elements, controls operation to write data associated with the with the write request to the first disk unit, controls operation to copy data change in the first disk unit to the second disk units, and receives a read request to the corresponding one of the second disk units from each of the processor elements.

4. The data storage system of claim 3, wherein the operation to copy data change is performed in response to a request from at least one of the processor elements.

* * * * *